April 25, 1950 W. J. ZENNER 2,505,728

SELECTIVE SIGNALING SYSTEM AND APPARATUS

Filed June 14, 1945 5 Sheets-Sheet 1

INVENTOR
WALTER J. ZENNER
BY Emery Robinson
ATTORNEY

April 25, 1950 W. J. ZENNER 2,505,728

SELECTIVE SIGNALING SYSTEM AND APPARATUS

Filed June 14, 1945 5 Sheets-Sheet 2

INVENTOR
WALTER J. ZENNER
BY Emery Robinson
ATTORNEY

SELECTIVE SIGNALING SYSTEM AND APPARATUS

Filed June 14, 1945 5 Sheets-Sheet 3

INVENTOR
WALTER J. ZENNER
BY Emery Robinson
ATTORNEY

SELECTIVE SIGNALING SYSTEM AND APPARATUS

Filed June 14, 1945 5 Sheets-Sheet 4

INVENTOR
WALTER J. ZENNER
BY Emery Robinson
ATTORNEY

April 25, 1950 W. J. ZENNER 2,505,728

SELECTIVE SIGNALING SYSTEM AND APPARATUS

Filed June 14, 1945 5 Sheets-Sheet 5

INVENTOR
WALTER J. ZENNER
BY Emery Robinson
ATTORNEY

Patented Apr. 25, 1950 2,505,728

UNITED STATES PATENT OFFICE 2,505,728

SELECTIVE SIGNALING SYSTEM AND APPARATUS

Walter J. Zenner, Des Plaines, Ill., assignor to Teletype Corporation, Chicago, Ill., a corporation of Delaware Application June 14, 1945, Serial No. 599,322

6 Claims. (Cl. 178—4)

The present invention pertains to printing telegraph systems and more particularly to transmission control systems.

The principal object of the present invention is to provide in a sequential selective control system for gathering previously prepared information means for automatically inserting predetermined missing code groups.

Another object of the invention is to provide a transmission control system wherein a centrally located station not only controls the order in which a series of stations connected thereto are caused to transmit previously prepared messages to said centrally located station but also automatically inserts predetermined missing code groups.

Specifically, the present invention provides automatic selective transmission control for use in connection with preliminary collection of weather information over a telegraph communication system. Control of this system is provided by primary sequential control equipment located at one primary switching center or master control station on the loop circuit. The system according to the present invention utilizes selector equipment at each way station, which is always connected to the line and surveys all traffic passing over the line.

A sequence collection transmission on this system starts with the transmission from the primary or central station of a predetermined sequence of characters which includes a two or more letter station identification of the first way station from which transmission is desired. At this point transmission from the primary or central station equipment ceases and the secondary or way station equipment, recognizing the identification letters of its station, starts transmission of the message (for example, weather information) waiting in the form of previously prepared perforated tape. At the conclusion of this message, end-of-message signals in the message tape are transmitted to shut down transmission from the way station and automatically activate the primary or central station equipment to transmit the station identification letters of the next desired way station to be called in. The sequence of transmission of station identification letters at the primary station is contained in a continuous loop of perforated tape. The loop of tape need be changed only when a rearrangement of the order in which station transmission occurs is desired.

In the system according to the present invention it is contemplated that weather information shall be collected hourly, at which times transmission of such information, which has been previously prepared on perforated tapes, from each station will occur automatically under the control of the master control station in predetermined order in response to the operation of a switch at the master control station. Pursuant to the operation of said switch, the entire sequence collection will take place automatically. As a preliminary to transmission, the primary or master control station attendant opens the line for a predetermined interval to stop any transmitter distributor which may be operating on the circuit. Following this, a sequence collection switch is operated and a so-called sequence collection heading is transmitted from the control tape in the primary (or central station) transmitter distributor. This heading comprises a group of signal codes, which precede each hourly weather sequence collection, which information is included in the afore-mentioned continuous loop of tape; for example, "Letters" code, Station identification (call letters of the central or master control station), carriage return code, ten line feed signals, S and C character codes (signifying Sequence collection), space signal, "Circuit of origin" number, Space, "Date-Time" group codes, "Letters," "Carriage return," and "Line feed." The foregoing codes control the page printer in the following manner: The "Letters" code places the printer in condition to print lower case characters. The station identification letters are then printed on the page and the carriage return signal returns the carriage to the beginning of line position. The ten line feed signals provide a space between the station heading and the first line of printing. The first characters are S and C meaning sequence collection. Then the circuit of origin number is printed, followed by the date and time when the weather information is taken, after which the printer is conditioned in the unshift position, the carriage is returned to the beginning of line position and the paper is spaced to present the next line of printing preparatory to receiving the weather report from the several way stations. Then the proper condition, select and lock codes of the first way station are transmitted, after which the primary station transmitter distributor stops. The equipment at the selected way station responds to these codes and starts transmission of the data contained in the perforated tape at the way station (for example, the weather information).

At the end of the data (or weather information) transmission an unlock code is transmitted by the way station. This code stops the transmitter distributor at the outlying or way station and is recognized by the primary or master control unit for the purpose of starting the transmission of the actuating codes for the next way station to be called in. In the event of the failure of the called station to transmit the unlock code at the end of transmission of weather information therefrom, or if the selected way station does not respond at the end of a given period of time, an auxiliary distributor at the primary or master control station will transmit a predetermined code signal followed by the unlock code. In this event, the unlock code will activate the primary or master control station equipment in the usual manner to start transmission of the actuating codes for the next way station transmission. This cycle will be repeated until the last selected station has reported, whereupon an appropriate signal, which is contained in the loop of tape, is transmitted from the primary or central station, the effect of which is to shut down the apparatus at the central station.

A better understanding of the invention may be had from the following description taken in conjunction with the accompanying drawings, wherein, Fig. 1 is a front view of the primary sequential control unit located at the central or master control station;

Figure 1:
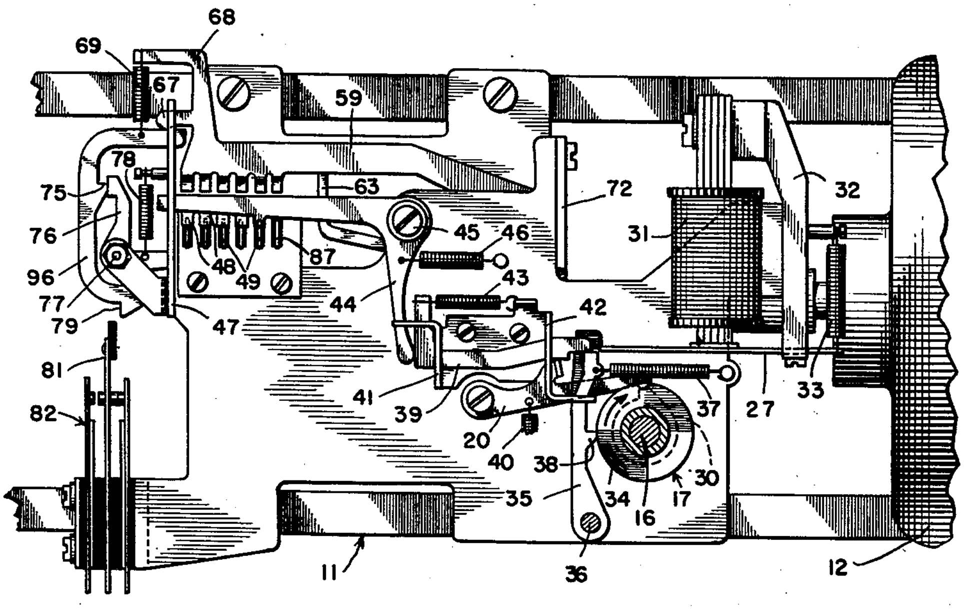

Having reference to Figs. 1 to 4, inclusive, the primary unit comprises a frame 11 which houses and supports the various mechanisms comprising the unit. For example, a motor 12 is suitably supported in the frame 11, and has a pinion 13 secured to the armature shaft 14. Pinion 13 meshes with a gear 15 carried on an operating shaft 16 journaled in the side portions of frame 11. Shaft 16 carries thereon a selector cam member 17, operating cams 18 and 19, eccentric 21 and friction clutches 22 and 23. Friction clutch 23 because of pressure exerted by compression spring 24 tends to rotate the selector cam member 17 but this rotation is prevented by a stop arm 25 which cooperates with a stop disc 26 of the friction clutch 23. Stop arm 25 is carried on the selector magnet armature 27 and operates to release the disc 26 for rotation when the selector magnet armature 27 is released in response to a start impulse, as is well known in the art. The operating cam sleeve 20, carrying cams 18 and 19, and eccentric 21, is released for rotation by a cam projection (not shown) on cam sleeve 17 acting through a trip-off bail identified by the numeric 28, in the manner similar to that shown in Fig. 5 of U. S. Patent No. 1,989,710 issued February 5, 1935, to A. H. Reiber et al. When the bail 28 is operated, it unlatches a stop disc 29, which is a part of friction clutch 22, for a single cycle of rotation.

A selector magnet 31 is mounted on a bracket 32 secured to the main frame 11 and operates the selector armature lever 27 which is pivotally arcticulated to bracket 32 and is normally biased clockwise (as viewed in Fig. 1) by a spring 33. With normal marking current on the signal line the armature 27 assumes the attracted position shown in Figs. 1 and 2 to thereby hold the selector cam sleeve 17 and the operating cam sleeve 10 against rotation. The cam sleeve 17 is provided with a series of cam notches 34, helically arranged so that upon rotation of cam sleeve 17 a corresponding series of levers 35, pivoted at 36, are selectively actuated sequentially. Levers 35 are normally biased against cam sleeve 17 by individual springs 37. With the armature member 27 in the position shown in Fig. 1, the levers 35 are free to respond to the pull of their individual springs 27 when the projections 38 thereon encounter their respective notches 34. However, if the armature member 27 assumes its released or spacing position due to the de-energization of magnet 31 and pull of spring 33, the levers 35 are blocked against clockwise movement by the end of armature 27 engaging the upper extremity thereof. Of course, it is understood that the member 27 vibrates for every change from marking to spacing position or vice versa.

Associated with each lever 35 is a selector bar 39 which is suitably mounted for sliding motion in comb bars 41 and 42. Bars 39 are normally biased rightwardly against bar 41 by individual springs 43. The right-hand ends of bars 39 normally rest on a pivoted bail member 20, so that immediately following the initiation of rotation of selector cam sleeve 17 the cam 30 releases the bail 20 which then responds to the pull of its spring 40 so that thereafter the right ends of bars 39 rest upon their associated levers 35. Then, when lever 35 is rotated clockwise in response to a marking signal, the end of the associated bar 39 will fall in front of lever 35. When the projection 38 is cammed out of notch 34 as the cam sleeve 17 rotates, the lever 35 will be actuated in a counterclockwise direction to thereby urge the bar 39 associated therewith in a leftward direction, as viewed in Fig. 1.

Cooperatively related to each bar 39 is a bell crank lever 44 pivotally mounted on pivot shaft 45. Each lever 44 is biased counterclockwise by a spring 46 to maintain the lower extremity of its depending arm against the left end of bar 39. The horizontal arms of levers 44 are guided at their extremities by a comb bar 47 and are each provided with a depending projection 48 which cooperates in blocking or latching relation with the ends of a corresponding series of code bars 49, as more clearly shown in Figs. 2 and 4. Each of the code bars 49 are normally biased leftwardly, as viewed in Fig. 4, by an individual spring 51. Thus, each code bar 49 tends to bear against the projection 48 of its associated bell crank lever 44.

Figure 3:
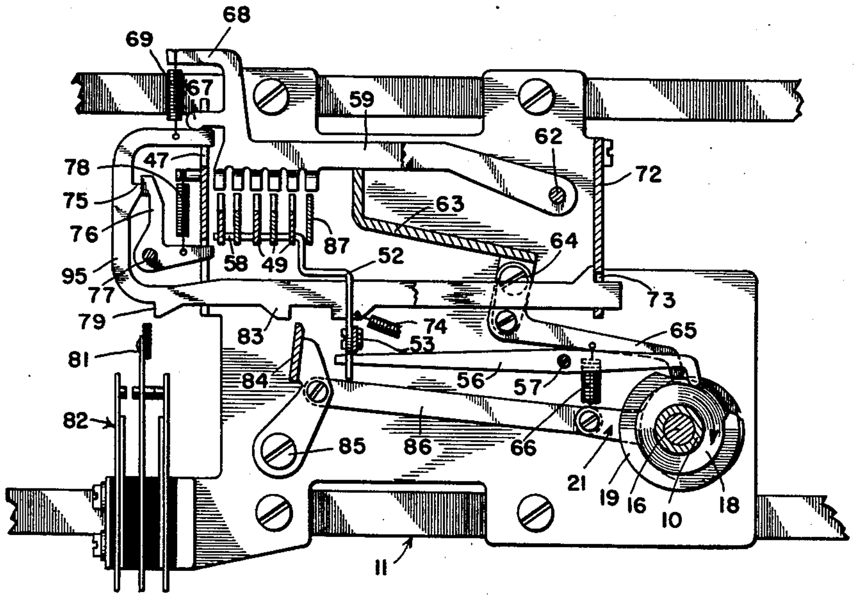
Fig. 3 is a sectional view taken substantially on line 3—3 of Fig. 2.
Figure 2:
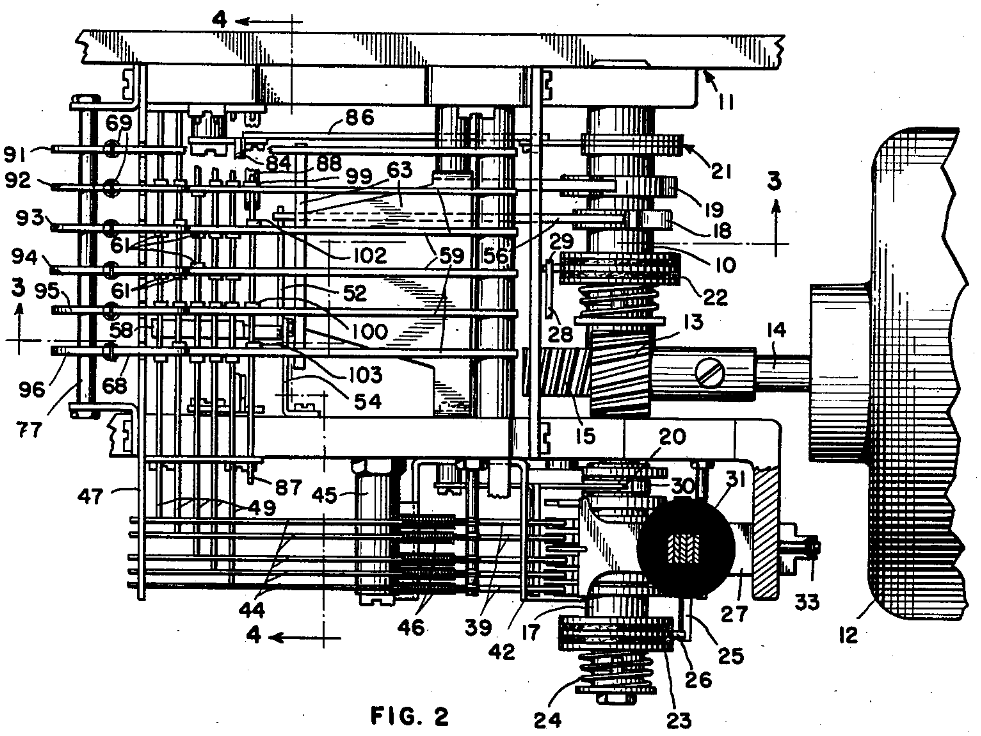
Fig. 2 is a top view of the union shown in Fig. 1.
Figure 4:
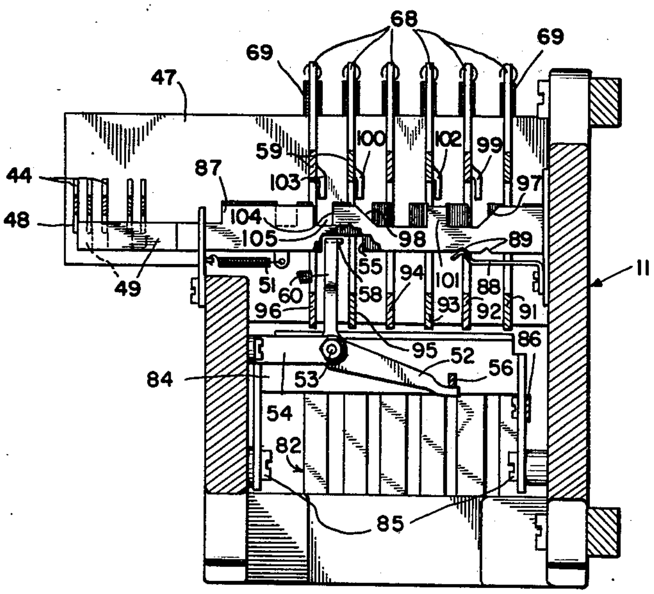
Fig. 4 is a sectional view taken substantially on line 4—4 of Fig. 2.

When the bell cranks 44 are rotated clockwise (as viewed in Fig. 1) in response to a marking impulse received by the selector magnet 31, the code bars 49 will become unlatched from projections 48 and will be actuated leftwardly (as viewed in Fig. 4) by springs 51. A code bar restoring bail 52 is pivoted at 53 (Fig. 4) on a bracket 54 secured to frame 11. Bail 52 is provided with a vertical arm which coacts at its extremity with a notch 55 in the bottom edge of each code bar 49. The horizontal arm of bail 52 bears, at its extremity, underneath the end of a code bar restoring bail operating lever 56 pivoted at 57 (Fig. 3). The opposite end of lever 56 bears against the periphery of the code bar restoring cam 18. A spring 60 acts to bias bail 52 counterclockwise (Fig. 4) to impart clockwise rotation to lever 56 (Fig. 3) to hold the cam follower end thereof against cam 18. Thus, following the selective operation of code bars 49, the cam 18 at the proper time acts to rotate lever 56 counterclockwise (as viewed in Fig. 3) to thereby rotate lever 52 clockwise (as viewed in Fig. 4) to actuate the bail portion 58 thereof rightwardly to carry the code bars 49 correspondingly to effect a latching engagement between the ends of code bars 49 and projections 48 of bell cranks 44.

Code bars 49 are provided along their upper edges with code projections and notches which cooperate with a group of selectable bars 59 superimposed above said code bars. Selectable bars 59 are provided with projections 61 which are deflected to one side or the other of the code bars in accordance with a predetermined pattern. Selectable bars 59 are pivotally mounted on a pivot shaft 62 and are adapted to rest upon a bail member 63 pivoted at 64. Fixed to bail 63 is a cam follower arm 65 which coacts with the periphery of cam 19 and a spring 66 acting to bias the arm 65 against cam 19. Bars 59 are provided with guide projections 67 which cooperate with slots in the comb bar 47. Bars 59 are further each provided with an extension 68 to which one end of a spring 69 is anchored, the other end of said spring being secured to an associated operating lever 91 to 96.

The operating levers 91 to 96 are pivotally articulated to support 72 through slots 73. Levers 91 to 96 are further guided near their left end (as viewed in Fig. 3) by the comb member 47. An individual spring 74 tends to normally pivot its associated levers 91 to 96 in a counterclockwise direction, which movement is restrained by spring 69 which is stronger than spring 74. In effect each bar 59 and its associated levers 91 to 96 move as a unit through the instrumentality of spring 69, except as hereinafter set forth. Bars 91 to 96 are each provided with a latching shoulder 75 which cooperates with a latching lever 76, pivoted at 77 and biased normally in a counterclockwise direction by a spring 78.

Levers 91 to 96 are also provided with a shoulder or projection 79 which cooperates with swinger 81 of a make-break contact member 82. These levers are further provided with a shoulder 83 which cooperates with an operating bail 84 pivoted at 85. A link 86 is connected at one end to bail 84 and at the other end to the eccentric 21, so that reciprocating motion is imparted to link 86 by the eccentric 21 to impart, in turn, oscillating motion to bail 84.

Associated with the set of code bars 49 is an additional bar 87, which is the shift-unshift code bar. Bar 87 has no normal position, but remains in the position to which it was last moved and is retained in such position by a detent spring 88 (Fig. 4), which cooperates with one or the other of a pair of V-shaped notches 89 formed in the bottom edge of bar 87. Bar 87 is provided with a pair of oppositely inclined surfaces 97 and 98 associated with the shift and unshift bars 92 and 95, respectively. When the unshift bar 95 is selectively operated, the code lug 100 thereon will coact with the inclined surface 98 to cam the bar 87 leftwardly. Conversely, when the shift bar 92 is actuated (after a prior actuation of unshift bar 95) the code lug 99 thereon will coact with inclined surface 97 to actuate the shift bar 87 rightwardly, the detent 88, of course, acting to retain bar 87 in its actuated position.

In the embodiment of the invention shown, the bar 87 is provided with a code lug 101 cooperating with bar 93, and a code notch cooperating with bar 96. In the embodiment shown, both bars 93 and 96 are responsive to the carriage return signal when set up in the code bars 49. However, bar 93 is the lower case carriage return bar, and bar 96 is the upper case carriage return bar. That is, bar 93 will be selected when the shift bar 87 has been first actuated to the unshift or leftward position (as viewed in Fig. 4) to remove projection 101 from beneath the code lug 102 of bar 93, and to cause the code lug 103 of bar 96 to be blocked by the projection 104 adjacent to notch 105 or bar 87. On the other hand, the upper case carriage return bar 96 will be selectively operated when the shift control bar 87 has been first moved rightwardly in response to the unshift or "Letters" code signal, to bring code notch 105 beneath the code lug 103, and the lug or projection 101 in blocking relation with code lug 102.

In the operation of the structure shown in Figs. 1 to 4, the code signal impulses are received by the selector magnet 31 in well known manner, the marking impulses attracting and holding the armature 27 and the spacing impulses releasing said armature. Since the normal stop condition of the signal line is a marking condition (current on the line) the magnet 31 will be energized and the armature 27 will be held attracted to thereby hold arm 25 thereof in blocking engagement with stop disc 26, to thus hold the operating elements on shaft 16 against rotation. Upon receipt of a start signal impulse (which is of spacing nature) the magnet 31 will be de-energized thus releasing its armature 27 to initiate rotation of the operating elements on shaft 16.

During the code signal cycle the armature 27 will act to block clockwise movement of levers 35 in response to spacing signals, and will permit rotation of levers 35 in response to marking signals. If the signal impulse is of marking nature, the lever 35 will move to the right and bar 39 fall off the top of said lever to thereby be operated leftwardly by the lever 35 when the latter is cammed out of notch 34. The leftward movement of bar 39 will act to rotate its bell crank 44 clockwise to unlatch its associated code bar 49. After the five code bars 49 have been thus released or not released depending upon whether the signal impulse was of a marking or spacing nature, a cam or sleeve 17 acts through clutch trip member 28 to release the sleeve 10 for rotation.

As the sleeve 10 begins its rotation, the cam 19 causes the bail 63 to be released to permit the bars 59 to sense the code bars 49. The bar 59 which finds an alignment of notches will be actuated further than the rest of the bars 59 by spring 74 to bring shoulder 79 into the path of the swinger 81. Also, shoulder 75 becomes engaged by its associated latch lever 76 to hold the selected lever 91—96 in its selected position until its associated contact 82 has been operated. All of the bars 59 are returned by bail 63 to their vertical position. The spring 69 of the selected bar 91—96 will be stretched since its associated bar cannot be returned until it has become unlatched, as will presently appear. With the selected lever 91—96 thus latched, the operating bail 84 is actuated, through link 86, by the eccentric 21. As the bail 84 is operated counterclockwise, it will engage the shoulder 83 of the selected bar 91—96 to thereby actuate the selected bar leftwardly, thus causing shoulder 79 thereof to operate swinger 81 and associated contacts. In its leftward movement, the shoulder 75 of the selected bar 91—96 becomes disengaged from the latch 76 to permit the selected bar to respond to the pull of its spring 69 to be returned to its upward position. Following the operation of bail 63 to return the bars 59 to the normal uppermost position, the cam 19 functions through levers 56 and 52 to return the code bars 49 to their unselected position whereat they are again latched by bell crank levers 44.

Figure 5:
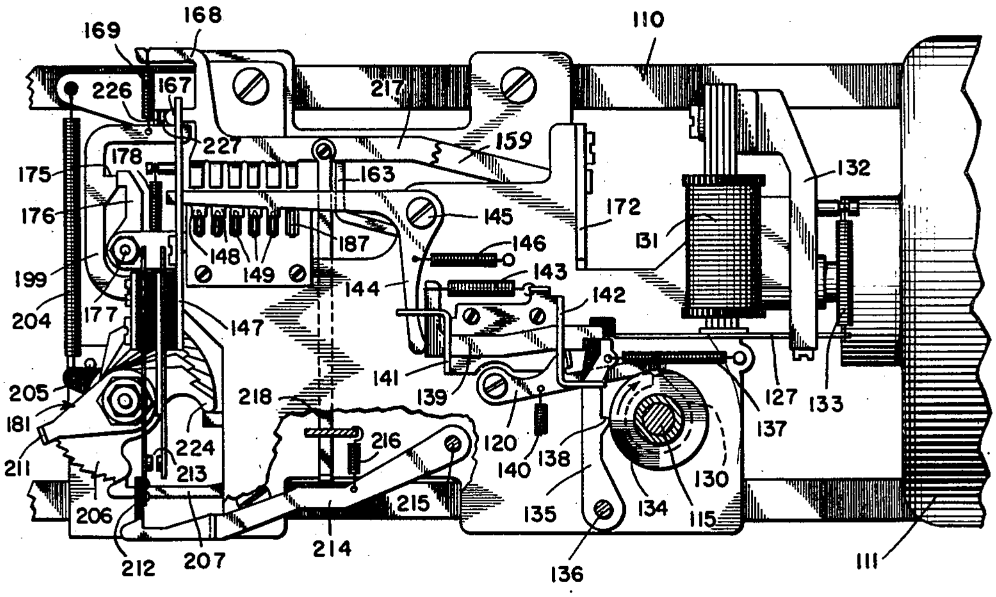
Fig. 5 is a front view of the control apparatus located at each of the way stations of a loop circuit.
Figures 7, 10:
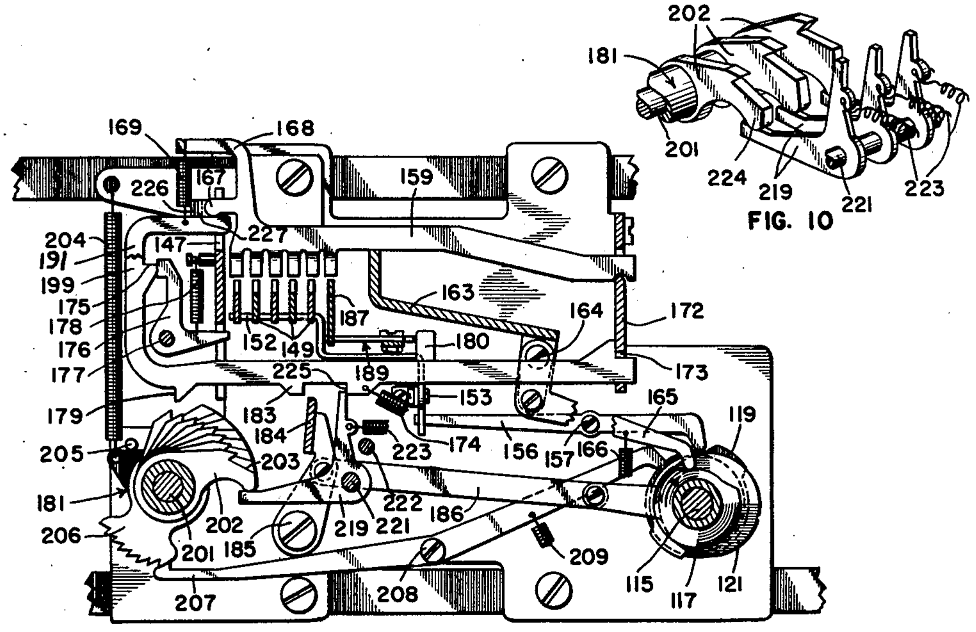
Fig. 7 is a sectional view taken substantially on line 7—7 of Fig. 6.
Fig. 10 is a fragmentary perspective view showing the relationship between the contact controlling ratchet assembly and the cutout levers.
Figures 6, 9:
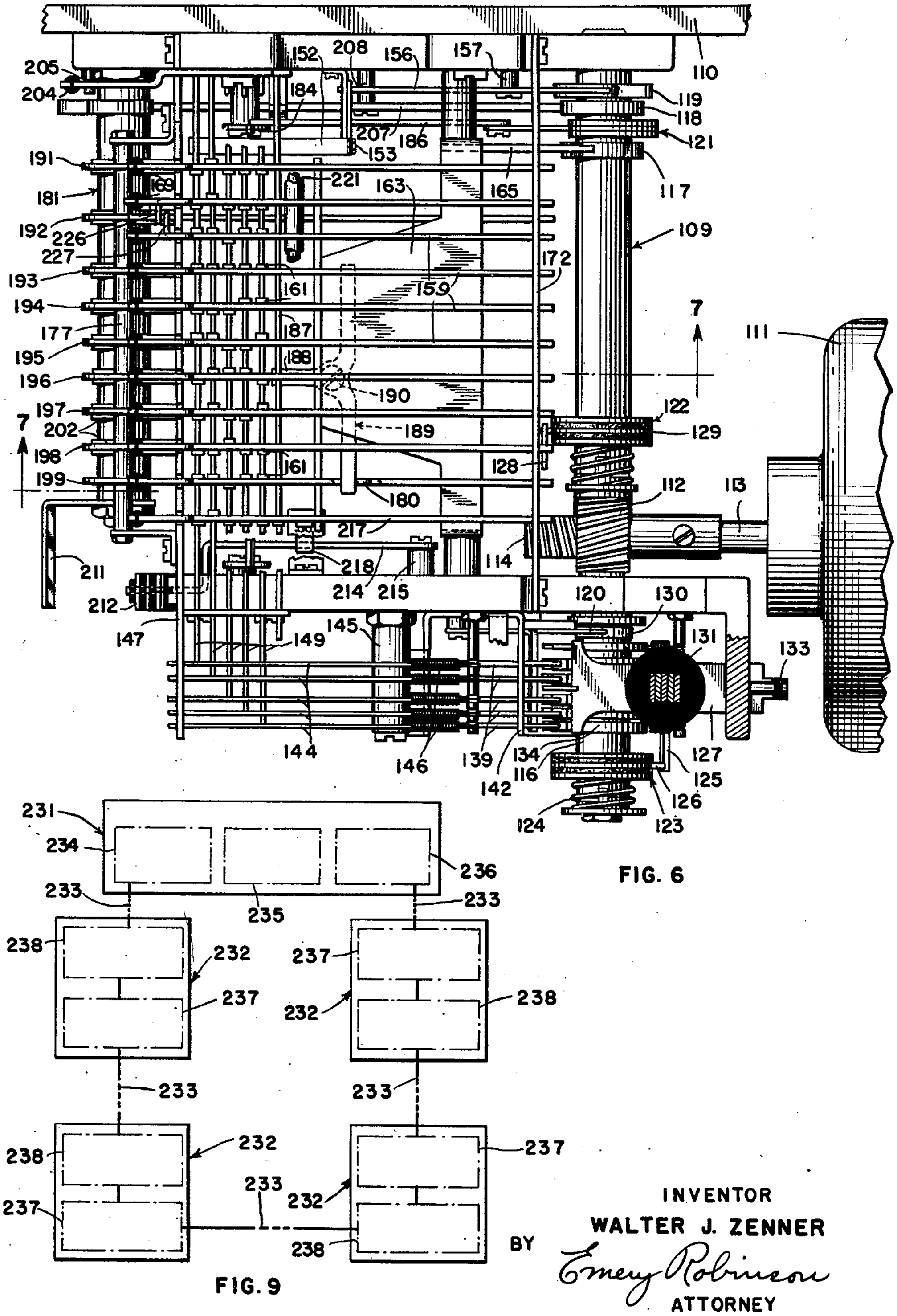
Fig. 6 is a top view of apparatus shown in Fig. 5.
Fig. 9 is a diagram of the loop circuit embodying the arrangement according to the present invention.

In Figs. 5, 6, and 7 are illustrated the control apparatus that is located at each of the way stations in the loop circuit embracing the sequential control system according to the present invention. This apparatus, which is similar in many respects to the primary apparatus shown in Figs. 1 to 4, comprises a main frame 110 which houses and supports the various mechanisms comprising the unit. The frame 110 supports a motor 111 which has a pinion 112 secured to the armature shaft 113. The pinion 112 meshes with a gear 114 carried on an operating shaft 115 journaled in the side portions of frame 110. Shaft 115 carries thereon a selector cam member 116, operating cams 117, 118, and 119, eccentric 121 and friction clutches 122 and 123. Friction clutch 123 because of pressure exerted by compression spring 124 tends to rotate the selector cam member 116 but this rotation is prevented by a stop arm 125 which cooperates with a stop disc 126 of the friction clutch 123. Stop arm 125 is carried on the selector magnet armature 127 and operates to release the disc 126 and clutch 123 for rotation when the selector magnet armature 127 is released in response to a start impulse, as is well known in the art. The operating cam sleeve 109 carrying cams 117, 118, and 119, and eccentric 121, is released for rotation by a cam projection (not shown) on cam sleeve 116 acting through a trip-off bail identified by the numeric 128, in the manner similar to that shown in Fig. 5 of U. S. Patent No. 1,989,710. When the bail 128 is operated it unlatches a stop disc 129, which is a part of friction clutch 122, for a single cycle of rotation.

A selector magnet 131 is mounted on a bracket 132 secured to the main frame 110 and operates the selector armature lever 127 which is pivotally articulated to bracket 132 and is normally biased clockwise (as viewed in Fig. 5) by a spring 133. With normal marking current on the signal line the armature 127 assumes the attracted position shown in Fig. 5, to thereby hold the selector cam sleeve 116 and the operating cam sleeve 109 against rotation. The cam sleeve 116 is provided with a series of cam notches 134, helically ar-
135 are normally biased against cam sleeve 116 by a corresponding series of levers 135, pivoted at 136, are selectively actuated sequentially. Levers 135 are normally biased against cam sleeve 116 individual springs 137. With the armature member 127 in the position shown in Fig. 5, the levers 135 are free to respond to the pull of their individual springs 137 when the projections 138 thereon encounter their respective notches 134. However, if the armature member 127 assumes its released or spacing position due to the deenergization of magnet 131 and pull of spring 133, the levers 135 are blocked against clockwise movement by the end of the armature. Of course, it is understood that the member 127 vibrates for every change from marking to spacing position or vice versa.

Associated with each lever 135 is a selector bar 139 which is suitably mounted for sliding motion in comb bars 141 and 142. Bars 139 are normally biased rightwardly against bar 141 by individual springs 143. The right-hand end of bars 139 normally rest on a pivoted bail member 120, so that immediately following the invitation of rotation of selector cam sleeve 116 the cam 130 releases the bail 120 which then responds to the pull of its spring 140 so that thereafter the right ends of bars 139 rest upon their associated levers 135. Then, when lever 135 is rotated clockwise, in response to a marking signal, the end of the associated bar 139 will fall in front of lever 135. When the projection 138 is cammed out of notch 134 as the cam sleeve 116 rotates, the lever 135 will be actuated in a counterclockwise direction to thereby urge the bar 139 associated therewith in a leftward direction, Fig. 5.

Cooperatively related to each bar 139 is a bell crank lever 144 pivotally mounted on pivot shaft 145. Each lever 144 is biased counterclockwise by a spring 146 to maintain the lower extremity of its depending arm against the left end of bar 139. The horizontal arms of levers 144 are guided at their extremities by a comb bar 147 and are each provided with a depending projection 148 which cooperates in blocking or latching relation with the ends of a corresponding series of code bars 149. Each of the code bars 149 are normally biased in the manner shown in Fig. 4 by an individual spring (not shown). Thus each code bar 149 tends to bear against the projection 48 of its associated bell crank lever 144.

When the bell cranks 144 are rotated clockwise (as viewed in Fig. 5) in response to a marking impulse received by the selector magnet 131, the code bars 149 will become unlatched by projection 148 and will be actuated downwardly (as viewed in Fig. 6) by their springs similar to springs 51. A code bar restoring bail 152 is pivoted at 153 (Fig. 7) on a bracket (not shown) secured to frame 110. Bail 152 is provided with a vertical arm which coacts at its extremity with a notch (not shown) in the bottom edge of each code bar 149 in a manner similar to the primary unit previously described. The horizontal arm of bail 152 bears, at its extremity, underneath the end of a code bar restoring bail operating lever 156 pivoted at 157 (Figs. 6 and 7). The opposite end of lever 156 bears against the periphery of the code bar restoring cam 119. A spring (not shown) acts to bias lever 152 to impart clockwise rotation to lever 156 (Fig. 7) to hold the cam follower end thereof against cam 119. Thus, following the selective operation of code bars 149, the cam 119 at the proper time acts to rotate lever 156 counterclockwise (as viewed in Fig. 7) to thereby rotate lever 152 to actuate the bail portion thereof to carry the code bars 149 correspondingly to effect a latching engagement between the ends of code bars 149 and projections 148 of bell cranks 144.

Code bars 149 are provided along their upper edges with code projections and notches which cooperate with a group of selectable bars 159 superimposed above said code bars. Selectable bars 159 are provided with projections 161 which are deflected to one side or the other of the code bars in accordance with a predetermined pattern. Selectable bars 159 are pivotally articulated to support 172 and are adapted to rest upon a bail member 163 pivoted at 164. Fixed to bail 163 is a cam follower arm 165 which coacts with the periphery of cam 117, a spring 166 acting to bias the arm 165 against cam 117. Bars 159 are provided with guide projections 167 which cooperate with slots in the comb bar 147. Bars 159 are further each provided with an extension 168 to which one end of a spring 169 is anchored, the other end of said spring being secured to an associated operating lever 191 to 199.

The operating levers 191 to 199 are pivotally articulated to support 172 through slots 173. Levers 191 to 199 are further guided near their left end (as viewed in Fig. 7) by the comb member 147. An individual spring 174 tends to pivot its associated lever 191 to 199 normally in a counterclockwise direction, which movement is restrained by spring 169 which is stronger than spring 174. In effect, bar 159 and a lever 191 to 199 move as a unit through the instrumentality of spring 169, except as hereinafter set forth. Bars 191 to 199 are each provided with a latching shoulder 175 which cooperates with a latching lever 176, pivoted at 177 and biased normally in a counterclockwise direction by a spring 178.

Levers 191 to 199 are also provided with a shoulder 179 which cooperates with a contact controlling ratchet assembly 181 in a manner which will hereinafter appear. These levers are further provided with a shoulder 183 which cooperates with an operating bail 184 pivoted at 185. A link 186 is connected at one end to bail 184 and at the other end to an eccentric 121, to impart, in turn, oscillating motion to bail 184.

Associated with the set of code bars 149 is an additional bar 187, which is the shift-unshift code bar. Bar 187 has no normal position, but remains in the position to which it was last moved, and is retained in such position by a detent spring similar to spring 88 shown in Fig. 4. Bar 187 is provided on its bottom edge with a slot which receives the stem portion 188 of a T-shaped lever 189 pivoted at 190. One arm of T-lever 189 cooperates with a projection 180 on lever 199 and the other arm is similarly related to lever 193 (Figs. 6 and 7). In the embodiment disclosed, lever 193 is the "Letters" or unshift lever and lever 199 is the "Figures" or shift lever. When the lever 193 is actuated leftwardly (Fig. 6) in a manner presently set forth the lever 189 will be rotated counterclockwise about pivot 190 to impart forward movement (downward in Fig. 6) to the shift-unshift bar 187. On the other hand, if the lever 199 is actuated leftwardly, the lever 189 will be rotated clockwise to impart rearward movement to the bar 187.

The ratchet assembly 181 is revolvably carried on a shaft 201 suitably journaled in the frame 110 and is provided with a helical arrangement of arms 202, one arm 202 being provided for each lever 191 to 199. Each arm 202 terminates in a ratchet tooth conformation and an inclined cam surface 203. A spring 204 tends to rotate the ratchet assembly 181 in a clockwise direction and to return the assembly 181 against a stop 205 mounted on the frame 110. The ratchet assembly 181 is also provided with a ratchet segment 206 which cooperates with a detent pawl 207 pivotally mounted at 208 to frame 110. Pawl 207 is normally biased in a clockwise direction (as viewed in Fig. 7) by a spring 209 to cause the cam follower portion thereof to ride on the periphery of cam 118.

Also carried on the ratchet assembly 181 is a contact operating arm 211 (Figs. 5 and 6) which cooperates with the insulated portion 212 of a pair of contacts 213 suitably mounted on comb plate 147. Cooperating with the insulated portion 212 of contacts 213 is a locking member 214 pivoted at 215. Member 214 is normally biased in a clockwise direction by a spring 216 so that when the arm 211 has been rotated or stepped in a counterclockwise direction, in the manner presently set forth, until it closes the contacts 213, the insulated portion 212 will become latched by the member 214 to hold the contacts 213 closed, while the ratchet assembly 181 (and arm 211) is returned to its position against the stop 205.

In response to a predetermined code signal the bar 217 (similar to bars 159) will be selectively operated. Therefore, as the bar 217 is thus activated counterclockwise due to the presence of an alignment of notches therefor in the set of code bars 149, a member 218 pivoted thereto and depending therefrom will depress the lever 214 to release it from latching engagement with the portion 212 of contact 213.

As shown in Figs. 7 and 10, the ratchet assembly 181 also cooperates, through each of its arms 202, with a corresponding series of cutout levers 219 pivoted on a rod 221, so that when the assembly 181 is returned to its extreme clockwise position against stop 205, each arm 202 will contact the horizontal arm of its associated lever 219, to hold the levers 219 in the position shown in Fig. 7 away from the common stop pin 222 and against the pull of individual springs 223.

In the operation of the unit shown in Figs. 5, 6, 7, and 10, the shaft 115 is constantly rotating, and the sleeves 116 and 120 thereon are, through the yielding attributes of friction clutches 122 and 123, held in their stop positions by stop elements 125 and 128, respectively.

Insofar as the selector mechanism of this unit is substantially similar to that of the embodiment shown in Figs. 1 to 4, the operation thereof will be described only briefly. As the code signal impulses are received by the selector magnet 131, the start signal initiates rotation of the selector cam sleeve 116 which, through the cooperation of levers 135 and armature lever 127, may or may not actuate bars 139 leftwardly to impart counterclockwise rotation to bell crank levers 144 to unlatch the code bars 149 to establish an alignment of notches corresponding to the received signal, to effect the selective operation of a lever 159.

Upon the selection of a lever 159, its associated lever 191 to 199 is operated simultaneously therewith by the spring 174 individual thereto and by the projection 167, to cause the selected lever 191 to 199 to become latched up by the coaction of latching pawl 176 with shoulder 175. Now, if the lever 191 has been selected, its shoulder 179 will become aligned with the tooth on the first (or upper) arm 202 so that when lever 191 is actuated leftwardly (as viewed in Fig. 7) by the bail 184, the ratchet assembly 181 is rotated or stepped a unit distance angularly and held thereat by the detent pawl 207 cooperating with ratchet segment 206. As the assembly 181 rotates in this manner the extremities 224 (Fig. 10) recede from the horizontal arms of cutout levers 219 so that as the lever 191 is returned to its rightward position by its spring 174 (following the return of bail 184 to its clockwise position) the projection or shoulder 179 of the returned lever 191 will ride up the slope 203 of the arm 202 associated with lever 191, whereupon shoulder 225 of lever 191 will be lifted clear of the vertical arm of cutoff lever 219 thus permitting lever 219 to be rotated by its spring 223 against stop 222, thus causing lever 219 to support lever 191. In this manner, the selected lever 191 will be held inoperative or nonresponsive to further selection until the ratchet assembly 181 shall have first been returned to its clockwise position against stop 205 at which time the extremities of arms 202 urge the levers 219 counterclockwise away from stop 222 and free of shoulders 225.

To cause the arm 211 to close the contact 213 the levers 191 to 199 must be operated in consecutive order to properly step the ratchet assembly 181 counterclockwise. During the stepping operation, while the shoulder 179 is still in engagement with an arm 202, the pawl 207 will be disengaged from ratchet segment 206 momentarily by cam 118, but will become re-engaged before shoulder 179 is again released from arm 202. The purpose for this is to insure a proper stepping action and still permit the return of the ratchet assembly 181 to its clockwise position against stop 205 in the event that the levers 191 to 199 do not follow each other in consecutive order. The codes for each of the levers 191 to 199 are so chosen as to agree with a predetermined group of code signals assigned to the particular unit at each way station so that when a sequence of code signals agreeing with a predetermined group is applied to the signal line the ratchet assembly 181 at the station identified by the predetermined group will be rotated so that its contact arm 211 will close its associated contact 213 and become locked by detent lever 214. However, should any code signal included in the predetermined group be missing, the assembly 181 will be stepped until one of the codes in the group disagrees with the assigned code, whereupon the assembly 181 will be returned to its position against the stop 205.

It will be observed that lever 192 (Fig. 6) is controlled by two of the bars 159, which bars are provided with laterally directed portions 226 and 227 superimposed above and in cooperative engagement with lever 192.

Figure 8:
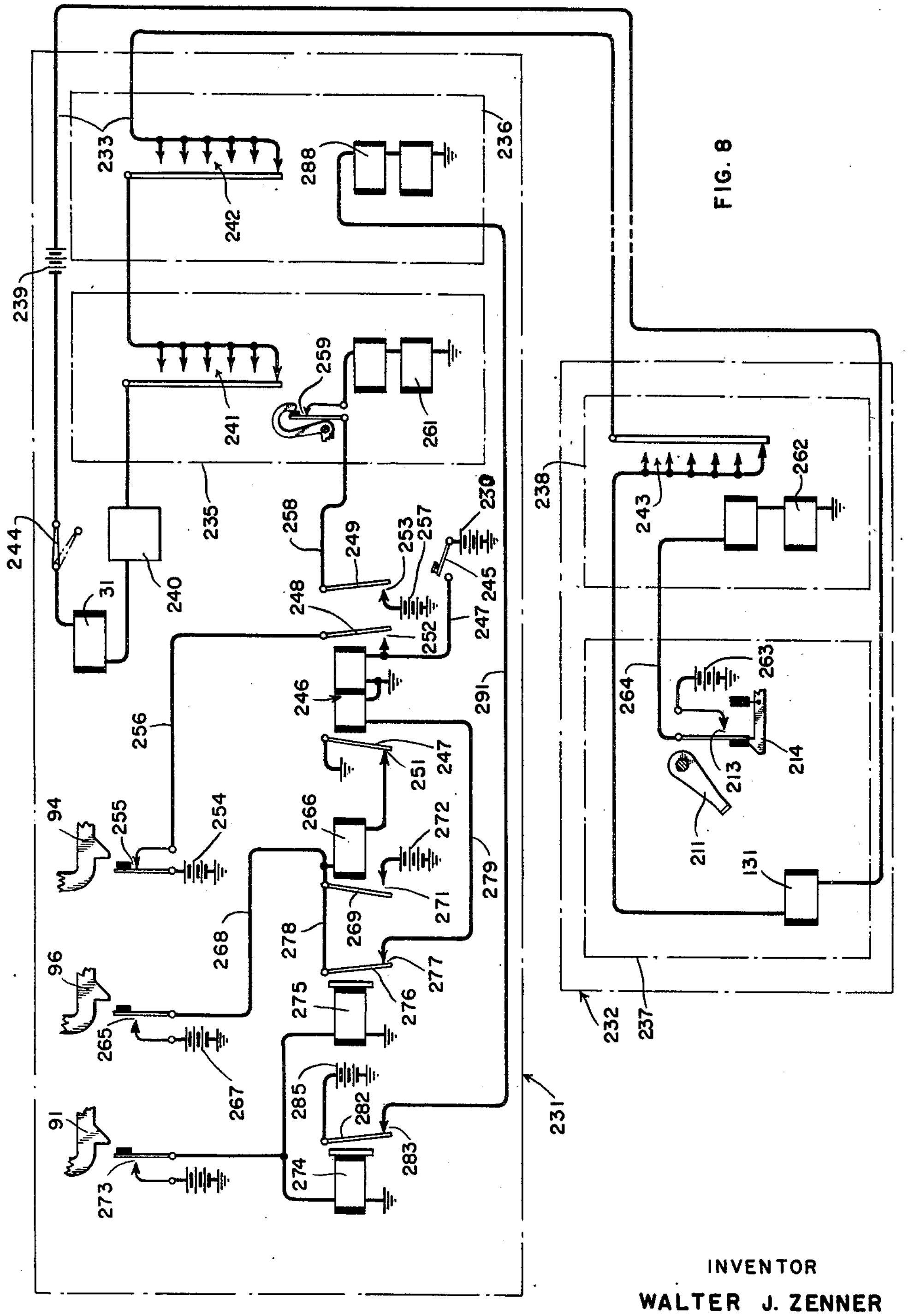
Fig. 8 is a schematic diagram of the electrical circuits at the central or master control station and way station.

Having reference to Fig. 9, a diagram of a loop circuit comprising a central or master control station 231 and a plurality of way stations 232 connected serially by a signal line 233 is shown. There may be 75 or more way stations in the loop circuit. The central station, in addition to the electrical relay arrangement shown in Fig. 8, is provided with the apparatus disclosed in Figs. 1 to 4, which is identified as 234 in Fig. 9. Also included in the central station circuit are two tape transmitter units 235 and 236 which are of the construction shown in U. S. Patent No. 2,296,845, issued September 29, 1942, to M. T. Goetz. At the way stations 232 the system comprises the apparatus shown in Figs. 5, 6, 7, and 10, which is identified as 237 in Fig. 9. There is also included in the way station circuit a tape transmitter 238 similar to units 235 and 236.

Having reference to Fig. 8, the signal line 233 is indicated as deriving its signal current from battery 239. The line circuit extends from battery 239, through the winding of selector magnet 31 of the control unit 234 (Fig. 9) at central station 231, through the telegraph printer 240, through the transmitting contacts 241 of transmitter 235, through the transmitting contacts 242 of transmitter 236, then through the transmitting contacts 243 of the transmitter 238 at the way station 232, through the winding of selector magnet 131 of the control unit 237, and back to battery 239. Since the stop contacts of the sets of transmitting contacts 241, 242, and 243 are normally closed, the line circuit is closed and its normal condition is therefore marking. Accordingly, the selector magnets 31 and 131 are normally energized.

Preparatory to sequential message collection a continuous loop of tape is prepared having perforated therein, in addition to the "Sequence collection heading" group of code signals mentioned previously, groups of code signals, each group pertaining to a particular way station, the said groups arranged in the order in which it is desired to call in the way stations. The loop of tape need be changed only when a rearrangement of the order in which station transmission occurs is desired. Each group of code signals pertaining to a particular way station comprises conditioning codes followed by the station identification letters of the way station from which transmission is desired followed by further conditioning codes. For example, in the system according to the present invention, such a group of code signals would comprise the following codes: Carriage return, Carriage return, "Letters" or unshift, A, B, C (or other station identification characters), Space and "Letters."

The loop of tape just mentioned is properly inserted in the tape transmitter 235 with the sequence collection heading group of code signals properly adjusted with respect to the transmitting contacts 241. The signal line is then opened for a predetermined interval of time by operating the switch 244. The open line or "break" condition is employed to shut down any transmitter-distributor that might be transmitting on the line at the time the sequence collection is due to begin.

Thereafter, to initiate sequential transmission the switch 244 is closed, and then the start key 245 is closed, thus completing a circuit from battery 230, through key 245, over conductor 247, and through the right-hand winding of start relay 246 to ground. Relay 246 upon energizing pulls up its armatures 247, 248, and 249, thereby opening contact 251 and closing contacts 252 and 253. The closing of contact 252 completes a locking circuit for relay 246 which extends from battery 254, through contact 255, over conductor 256, over armature 248, through contact 252, then through the right-hand winding of relay 246 to ground. With the present embodiment, the start key 245 is opened after the relay 246 becomes locked up, because thereafter the advancement of the loop of tape to select the way stations is accomplished automatically. In the "Sequence collection heading" the dash or hyphen code signal is substituted for the normal space code signal because in the operation of the present embodiment of the invention the space code signal has a special function, as will hereinafter appear.

Upon the closing of contact 253 a circuit is completed from battery 257, through contact 253, over armature 249, over conductor 258, through tape out switch 259, then through the windings of clutch magnet 261, to ground. Since the transmitting unit 235 may be of the type shown in U. S. Patent No. 2,296,845, it will be evident that the energization of magnet 261 permits the transmitting cam shaft to rotate to operate the transmitting contacts 241 sequentially in accordance with the code perforations sensed in the tape (not shown). Following the transmission of the "Sequence collection heading" perforated in the loop of tape, the groups of signals pertaining to the way stations to be selected are then transmitted. As previously mentioned, the groups of code signals for selecting a way station comprises a group of conditioning code signals (C. R., C. R., Letters), the station identification code signals (ABC, or any other set of characters), and the "lock" code signals (Space, Letters). The effect of these code signals on the selector 237 at the way station, as has been set forth hereinbefore, is to rotate the contact arm 211 to effect the closure of a contact 213 to initiate transmission from the selected way station to the primary or central station.

As set forth previously, the space code signal performs a special function. This function resides in stopping the transmission of station selecting signals from transmitter 235 during the time transmission takes place from the way station transmitter 238. When the space code signal is impressed on the signal line 233 the selector magnet 31 is effective to cause the selection of the space selector bar 94 of the selector apparatus shown in Figs. 1 to 4. The selection and operation of bar 94 effects the opening momentarily of contact 255, the effect of which is to open the locking circuit for relay 246, which then releases its armatures 247, 248, and 249. Upon releasing the armature 249, the energizing circuit for clutch magnet 261 is broken, to thereby arrest transmission from the transmitter 235 under the control of the afore-mentioned loop of tape. However, due to the overlap in the selector mechanism exemplified by magnet 31, the "Letters" code signal is transmitted to place all printers on the line in an unshift condition, and to allow for line propagation time.

As the arm 211 of control unit 237 at the selected way station 232 is rotated its full distance, it becomes latched up by the latch 214 to hold the contact 213 closed. The closing of contact 213 establishes an energizing circuit for the clutch magnet 262 of the tape transmitter 238, which extends from grounded battery 263, through contact 213, over conductor 264, through the winding of clutch magnet 262 to ground. The tape transmitter 238 is also of the type disclosed in U. S. Patent No. 2,296,845, and the operation of magnet 262 effects the release of the transmitting cam shaft for rotation, to sequentially operate the transmitting contacts 243 in accordance with perforations in the tape, to transmit to the primary station 231 the weather information (or other message matter) contained in the tape.

At the conclusion of the message contained in the way station tape, a group of code signals indicative of message termination is perforated therein, the effect of which, upon receipt by the primary station 231, is to initiate transmission again from the loop of tape in transmitter 235 to select the next way station, and also to automatically stop transmission at the way station from which message transmission has just been concluded. The message end group of signals comprises, in the present embodiment of the invention, the following code signals: "Figures" (or shift), Carriage return (C. R.) and "Letters" (unshift). The receipt of these signals by the selector magnet 131 of the control unit 237 at the way station 232 will have the effect of selecting the upper case carriage return bar 217 (Fig. 6) which, when operated, acts through the plunger 218 to disengage latch 214 from the contact 213 thereby opening the contact 213 to break the energizing circuit for clutch magnet 262, thus precluding further transmission at this time from way station 232.

At the primary station 231 the message-end group of signals will have the effect of selecting the selector bar 96 in the manner previously described in connection with Figs. 1 to 4. The bar 96 upon selection is operated to close contact 265 to complete an energizing circuit for relay 266 from grounded battery 267, through contact 265, over conductor 268, through the winding of relay 266, through contact 251, and over armature 247 to ground. Relay 266 when thus operated pulls up its armature 269 to close a contact 271, thereby completing a locking circuit for relay 266 from grounded battery 272, through contact 271, over armature 269, through the winding of relay 266, through contact 251 and over armature 247 to ground.

The contact 273 is a universal contact and is operated by bar 91 in response to all code signals. Relays 274 and 275 are of the slow-to-release type and are controlled by contact 273. Thus, when contact 273 closes, the relays 274 and 275 become energized over obvious energizing circuits. When transmission from the way station ceases, the contact 273 remains open, and the relay 275 releases after a period of time to allow its armature 276 to close contact 277 to complete a circuit for energizing the left-hand winding of relay 246 from grounded battery 272, through contact 271, over armature 269, over conductor 278, over armature 276, through contact 277, over conductor 279, through the left-hand winding of relay 246 to ground.

Relay 246 will pull up its armatures 247, 248, and 249 to complete a locking circuit therefor as previously traced from battery 254 and through contact 252 (now closed). Also, contact 251 will be opened to break the previously described locking circuit for relay 266. The opening of contact 271 (due to the de-energization of relay 266) will break the energizing circuit for the left-hand winding of relay 246, but this relay will nevertheless remain energized over the previously described locking circuit. Moreover, the contact 253 of locked relay 246 will be closed to complete an energizing circuit (as previously traced) for the clutch magnet 261 to again initiate the operation of tape transmitter 235 to transmit the group of code signals pertaining to the next way station to be selected.

After the next way station 232 has been called in and its contact 213 has been closed, the transmission of the message matter previously prepared thereat will be initiated and will continue until the message-end group of signals has been transmitted, which latter group of signals will cause the contact 265 to be again closed to effect the reoperation of transmitter 235 to select the next way station.

In this manner the automatic and sequential control of the way stations 232 by the primary station 231 will proceed until after the last way station has been called in and heard from, at which time a sixth sensing pin will find a hole in the tape to effect the opening of the tape-out contact 259 in the manner disclosed in U. S. Patent No. 2,296,845, wherein pin 89 (Fig. 4 of the patent) is the sixth or tape-out pin.

In the event that the selected or called way station fails to respond to the call of the master control or primary station, or in case the way station just terminating its message transmission fails to send an end-of-message group of signals, provision is made for both of these eventualities by providing in the circuit arrangement shown in Fig. 8, a slow-to-release relay 274. The universal contact 273 closes in response to signals transmitted by unit 235 as well as unit 238. Thus, so long as signals are being impressed on the signal line 233 from whichever source, bar 91 will be selected and contact 273 will be closed and opened continually and accordingly, relays 274 and 275, being slow-to-release, are continuously energized. In this manner sufficient time is given for the end-of-message group of signals to be received or for the next selected way station to respond. In either event, after a predetermined release time, the armature 282 of relay 274 will be released to close contact 283 to complete an energizing circuit for clutch release magnet 288 of the fixed message transmitter 236, which circuit extends from grounded battery 285, over armature 282, through contact 283, over conductor 291, then through the winding of magnet 288 to ground.

Magnet 288 operates to release the transmitting cam shaft for rotation to operate the transmitting contacts 242 sequentially in accordance with cam projections of so-called fixed message cam cylinders of the type shown in U. S. Patent No. 1,879,524 granted September 27, 1932, to R. D. Salmon et al., wherein the fixed message is transmitted during a single revolution of the cam shaft. The fixed message transmitted over line 233 by the fixed message transmitter 236 comprises the following: "Missing-Figures-Carriage return-Letters." As these signals are impressed on the signal line 233 the selector magnet 31 will, of course, respond and accordingly, the universal selector bar 91 will again be operated constantly, thereby closing contact 273 periodically to effect the operation of relay 274. Relay 274 remains energized and accordingly the contact 283 remains open, thus breaking the circuit for relay 288.

The group of signals comprising the fixed message will have the effect of selecting the bar 96 (which is the upper case carriage return bar) to close the contact 265 to control the operation of relay 266, which as previously set forth, controls the operation of transmitter 235 to effect the transmission of the station selection code signals.

While the foregoing description has been explained and described with reference to specific embodiments, it is not intended to be restricted in any manner to the language of the detailed specification nor to the illustrations in the accompanying drawings, except as indicated in the hereunto appended claims.

What is claimed is:

1. In a telegraph system, a primary station, a plurality of secondary stations connected to said primary station, means at said primary station for rendering said secondary stations effective selectively in a predetermined sequential order to transmit messages to said primary station, mechanical selector means at each of said secondary stations comprising selectable members responsive to groups of signals transmitted from said primary station, whereby said selectable members when operated in predetermined order are effective to read said transmitted signals to condition a secondary station for transmission according to the group of signals identified therewith, means at said primary station responsive to a group of conditioning codes indicative of message termination from said secondary stations to control the calling in of the next secondary station in said predetermined order, a fixed message transmitter at said primary station, and means at said primary station effective upon the failure of reception of said group of conditioning codes to render said fixed message transmitter operative to automatically insert said group of message termination codes.

2. In a telegraph system, a primary station, a plurality of secondary stations serially connected to said primary station, means at said primary station for rendering said secondary stations effective selectively in a predetermined sequential order to transmit messages to said primary station, means at each of said secondary stations responsive to groups of signals transmitted from said primary station to read said transmitted signals to condition a secondary station for transmission according to the group identified therewith, means at said primary station responsive to a group of conditioning codes indicative of message termination from said secondary stations to control the calling in of the next secondary station in said predetermined order, and means at said primary station effective upon the failure of reception of said group of conditioning codes to automatically insert said group of message termination codes.

3. In a telegraph system, a primary station, a plurality of secondary stations serially connected to said primary station, means at said primary station for rendering said secondary stations effective selectively in a predetermined sequential order to transmit messages to said primary station, permutation selector means at each of said secondary stations comprising selectable members responsive to groups of permutation code signals transmitted from said primary station, whereby said selectable members when operated in predetermined order are effective to condition a secondary station for transmission according to the group of permutation code signals identified therewith, means at said primary station responsive to a group of conditioning codes indicative of message termination from said secondary stations to control the calling in of the next secondary stations in said predetermined order, a fixed message transmitter at said primary station, further means at said primary station operable invariably in response to code signals, and relay means at said primary station effective under the control of said further means upon the failure of reception of said group of conditioning codes to render said fixed message transmitter operative to automatically insert said group of message termination codes.

4. In a telegraph system, a primary station, a permutation code selector mechanism at said primary station, a plurality of secondary stations serially connected to said primary station, relay means at said primary station cooperable with the selector mechanism thereat for rendering said secondary stations effective selectively in a predetermined sequential order to transmit messages to said primary station, means at each of said secondary stations comprising a permutation code selector mechanism having selectable members responsive to groups of permutation code signals transmitted from said primary station, whereby said selectable members when operated in predetermined order are effective to read said transmitted code signals to condition a secondary station for transmission according to the group of signals identified therewith, means in said first recited permutation code selector mechanism responsive to a group of conditioning codes indicative of message termination from said secondary stations to control the calling in of the next secondary station in said predetermined order, a fixed message transmitter at said primary station, further means in said first recited permutation code selector mechanism responsive invariably to all code signals, and relay means at said primary station effective under the control of said further means upon the failure of reception of said group of conditioning codes to render said fixed message transmitter operative to automatically insert said group of message termination codes.

5. In a telegraph system, a primary station, a plurality of secondary stations serially connected to said primary station, means at said primary station for rendering said secondary stations effective selectively in a predetermined sequential order to transmit permutation code signals to said primary station, permutation code selector means at each of said secondary stations, said selector means comprising a plurality of selectable bars and a cylinder having a helically arranged series of projections cooperatively related to said selectable bars, means for rendering said selectable bars responsive to said transmitted code signals to actuate said cylinder to condition the secondary station according to the group identified therewith, means at said primary station responsive to a group of conditioning codes indicative of message termination from said secondary stations to control the calling in of the next secondary station in said predetermined order, a fixed message transmitter at said primary station, and means at said primary station effective upon the failure of reception of said group of conditioning codes to render said fixed message transmitter operative to automatically insert said group of message termination codes.

6. In a telegraph system, a primary station, a plurality of secondary stations serially connected to said primary station, means at said primary station for transmitting permutation code signals for rendering said secondary stations effective selectively in a predetermined sequential order to transmit messages to said primary station, a permutation code selector mechanism at each of said secondary stations, said mechanism comprising a plurality of selectable bars, and a cylinder provided with a helically arranged series of projections cooperatively related to said selectable bars, means for selectively operating said bars in response to said transmitted code signals for determining the rotative positionment of said cylinder to condition a secondary station for transmission according to the group of permutation code signals identified therewith, means at said primary station responsive to a group of conditioning codes indicative of message termination from said secondary stations to control the calling in of the next secondary station in said predetermined order, a fixed message transmitter at said primary station, and means at said primary station effective upon the failure of reception of said group of conditioning codes to render said fixed message transmitter operative to automatically insert said group of message termination codes.

WALTER J. ZENNER.

REFERENCES CITED

The following references are of record in the file of this patent:

UNITED STATES PATENTS

| Number | Name | Date |
|---|---|---|
| 1,821,110 | Morton | Sept. 1, 1931 |
| 2,082,725 | Simmons | June 1, 1937 |
| 2,347,831 | Kinkead | May 2, 1944 |
| 2,381,871 | Bacon et al. | Aug. 14, 1945 |
| 2,444,078 | Weaver | June 29, 1948 |

Certificate of Correction

Patent No. 2,505,728 April 25, 1950

WALTER J. ZENNER

It is hereby certified that errors appear in the printed specification of the above numbered patent requiring correction as follows:

Column 3, line 33, for the word "union" read *unit*; column 7, line 75, before the numeral "135" insert *ranged so that upon rotation of cam sleeve 116 a corresponding series of levers*; same line 75, beginning with "are normally" strike out all to and including "levers 135" in column 8, line 1; column 8, line 4, before "individual" insert *by*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*